United States Patent Office 3,535,185
Patented Oct. 20, 1970

3,535,185
CURING OF ADHESIVES USED FOR JOINING
OPPOSED SURFACES
John L. Tveten, Baytown, and Rowland Pettit, Austin,
Tex., assignors to Esso Research and Engineering
Company
Filed Oct. 3, 1966, Ser. No. 583,762
Int. Cl. C08g 7/00, 37/18
U.S. Cl. 156—335
7 Claims

ABSTRACT OF THE DISCLOSURE

The rate and extent of curing an aromatic-formaldehyde condensation product with phenol which is employed as an adhesive for opposed surfaces is increased by adding to the condensation product an amount of formaldehyde up to about 4% by weight followed by spreading the condensation product, added formaldehyde, and an effective amount of an acid catalyst on at least one of the surfaces prior to reaction to join the surfaces by reacting the condensation product and formaldehyde by heating thereof in the presence of said effective amount of said acid catalyst to form a reaction product having an oxygen content of at least 13% by weight.

---

Figure 1:
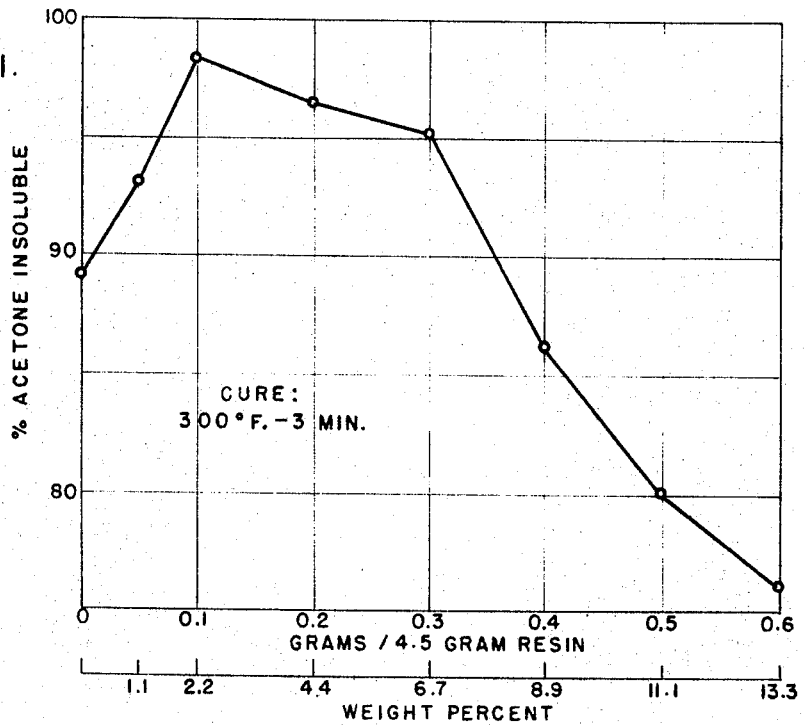

The present invention is directed to the curing of an adhesive. More particularly, the invention is concerned with increasing the rate and extent of curing of an aromatic-formaldehyde condensation product with phenol. In its more specific aspects, the invention is concerned with increasing the rate and extent of curing of a xylene-formaldehyde condensation product with phenol.

The present invention may be briefly described as a method for increasing the rate and extent of curing of an aromatic-formaldehyde condensation product with phenol in which there is added to the condensation product an additional effective amount of formaldehyde up to about 4% by weight based on the condensation product. The condensation product and phenol are then reacted at a reaction temperature within the range from about 200° F. to about 400° F. in the presence of an effective amount of an acid catalyst.

Since the aromatic-formaldehyde condensation product with phenol is an adhesive suitable for use in plywood manufacture and the like, the rate and extent of curing may be increased during the use of the adhesive in the manufacture of plywood and the like in which layers of the plywood are adhered together by the adhesive. Thus, in accordance with the present invention, the condensation product with the added formaldehyde may be spread on at least one of the surfaces of the wood or other material which is to be glued together and the reaction caused by applying heat in the presence of a catalyst.

The temperature is suitably within the range from about 200° F. to about 400° F. with a preferred temperature range from about 250° F. to about 300° F.

The acid catalyst is preferably xylene sulfonic acid catalyst, but other catalysts such as but not limited to a 20% to 80% by weight aqueous sulfuric acid, formic acid, trifluoroacetic acid, and aromatic sulfonic acids such as toluene and benzene sulfonic acids may be used.

The acid catalysts may be employed in an amount within the range from about 0.5% to about 5.0% by weight based on the condensation product. When xylene sulfonic acid is the catalyst, about 3.5% by weight based on the condensation product may be used.

The effective amount of additional formaldehyde is up to about 4% by weight, but ordinarily an amount in the range from about 1% by weight to about 2% by weight may be used.

The aromatic-formaldehyde condensation product with phenol is preferably xylene-formaldehyde condensation product with phenol, but other aromatics may be used, such as benzene, toluene and the like. When the aromatic-formaldehyde condensation product with phenol is obtained from xylene, it may be obtained by the acid catalyzed reaction of xylene and formaldehyde. The xylene may be ortho-, meta-, or para-xylene or preferably as a mixture thereof with ethylbenzene since this is an easily obtained petroleum refinery stream. Meta-xylene is the most reactive component followed by ortho-xylene. Formaldehyde may be employed as such or as Formalin, paraformaldehyde, trioxane and the like. Paraformaldehyde is preferred. Xylene-formaldehyde condensation product may contain from about 10–17 wt. percent of oxygen. Preferably, however, the condensation product with phenol contains over 13 wt. percent of oxygen. Where the condensation product with phenol contains less than 13% by wt. of oxygen, the practice of the present invention allows the oxygen content to be increased to over 13 wt. percent. This is quite desirable since at oxygen contents substantially lower than about 13 wt. percent in the base resin, the adhesive properties, when spread on plywood, may be detrimentally affected.

The relative proportions of aromatics, such as xylene, formaldehyde and acid catalysts, are selected to yield an acid/oil weight ratio of about 0.02 to about 10 and a xylene/formaldehyde mol ratio from about 1 to about 100.

In reacting the aromatics and formaldehyde, such as xylene and formaldehyde, the reactants are continuously reacted in a stirred reaction zone in the presence of the catalyst under conditions which may include a residence time of about 3 minutes to 4 hours, a temperature of 70° F. to 250° F. and a presence sufficient to maintain at least a portion of each of the reactants in liquid phase. Water is removed from the vapor phase which is withdrawn, and the remainder of the vapor phase is recycled to the reaction zone. Thereafter, the reaction mass is withdrawn and settled to obtain an acid phase and a hydrocarbon phase, the hydrocarbon phase being separated by decantation and neutralized (e.g., by adding sodium carbonate).

The neutralized hydrocarbon phase is fractionated in a distillation tower under a reduced pressure of about 5 to about 150 mm. Hg absolute and at a bottom-of-tower temperature of about 200° C. to about 250° C.

A bottoms product boiling above about 600° F. (corrected to 760 mm. Hg) is recovered which contains from 13 to 17 wt. percent (preferably about 16 wt. percent of combined oxygen. Typical properties of xylene-formaldehyde condensation products are shown in the following Table I:

TABLE I.—TYPICAL PROPERTIES OF XYLENE-FORMALDEHYDE CONDENSATION PRODUCT

|  | (1) | (2) |
|---|---|---|
| Molecular weight | 510 | |
| Specific gravity, 60/60° F | 1.097 | 1.079 |
| Oxygen content, wt. percent | 16.1 | 16.9 |
| Viscosity, SSU at 210° F | 150 | 12 |
| Color, Gardner | 1 | 9 |

As evidenced from the foregoing table, the properties of the xylene-formaldehyde condensation product may vary even at the same oxygen content and specific gravity.

Products such as described in Table I are then reacted with phenol by heating the condensation product and phenol at a temperature between 40° F. and 280° F. for a length of time suitable to produce a xylene-formaldehyde condensation product with phenol having the desired properties. Temperature and time employed in this stage are dependent upon the quantity of catalyst used and upon the extent of pre-polymerization (with viscosity being the measure) as may be desired. During this stage of the reaction, the molecular weight increases as evidenced by an increase in viscosity. The reaction may be stopped at any particular time by the addition of a stoichiometric quantity of potassium hydroxide or other base dissolved in a suitable solvent such as methanol and the like.

Typical properties of xylene-formaldehyde condensation product with phenol are shown in the following Table II:

TABLE II

|  | Range | Preferred |
|---|---|---|
| Viscosity (centipoises at 80° F.) | 2,000–10,000 | 3,000 |
| Molecular weight (avg.) | 250–350 | 314 |
| Oxygen content | 13.5–15 |  |
| Specific gravity | 1.08–1.10 |  |

In accordance with the present invention, the aromatic-formaldehyde condensation products with phenol may be used as an adhesive such as in plywood manufacture or in adhering other relatively porous materials together. Such other materials may be exemplified by wood chips for particle board, bagasse, paper, cloth, leather and the like. In the employment of these aromatic formaldehyde condensation products with phenol such as xylene-formaldehyde condensation products with phenol as adhesives, it is highly desirable to increase the rate and extent of curing of these materials to decrease the press time and temperature in the manufacture of plywood and to prevent the unreacted adhesive from soaking into the wood which naturally consumes adhesive without adding to the strength of the plywood. In accordance with the present invention, the rate and extent of curing of condensation products with phenol is increased by adding a small amount of formaldehyde, preferably in the form of solid paraformaldehyde, to the adhesive before spreading it on the plywood board in the presence of an acid catalyst followed by reaction by applying heat such as in the press. In forming the plywood under these conditions, a rapid and complete cure is obtained.

Without limiting the invention to any particular mechanism, it is believed that the adhesive in the presence of formaldehyde readily becomes cross-linked without the need of first breaking carbon-oxygen bonds. While this latter type of cross-linking by breaking carbon-oxygen bonds may be desirable, it is not necessary for the initial setting reaction in accordance with the present invention.

Thus, it has been found that addition of a small amount of formaldehyde in the form of finely powdered paraformaldehyde to xylene formaldehyde condensation product with phenol increases the rate and extent of the thermosetting reaction in the manufacture of plywood.

Figure 2:
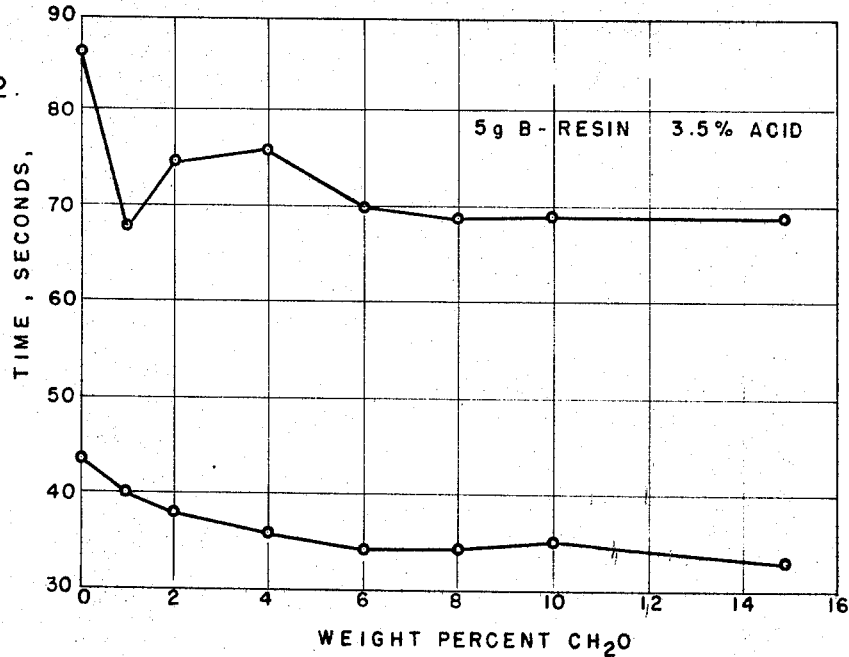

The present invention will be further illustrated by reference to the drawing in which:

FIG. 1 is a plot of data showing the percentage of acetone insolubles plotted against the addition of formaldehyde to the adhesive; and FIG. 2 shows the time plotted against the wt. percent of formaldehyde for reaction of the adhesive with formaldehyde.

The data of FIG. 1 were obtained by curing the adhesive with various amounts of admixed paraformaldehyde at 300° F. for three minutes with 3.5% xylene sulfonic acid catalyst. The resulting products were then ground and extracted with acetone to determine the amount of cross-linking by insolubility. In these particular operations, it is of interest to note that the addition of 2% by weight of paraformaldehyde results in an increase of cross-linking of the final material as well as in the rate of reaction. Up to about 4% by weight of the formaldehyde produces a desirable amount of cross-linking but thereafter increased amounts cause a dropping off in the cross-linking as indicated by acetone insolubility. These data are shown in Table III:

TABLE III

| Grams $(CH_2O)_x$ | Wt. percent | Percent acetone insoluble |
|---|---|---|
| 0 | 0 | 89.14 |
| 0.05 | 1.1 | 93.35 |
| 0.1 | 2.2 | 98.30 |
| 0.2 | 4.4 | 96.58 |
| 0.3 | 6.7 | 95.22 |
| 0.4 | 8.9 | 86.24 |
| 0.5 | 11.1 | 80.16 |
| 0.6 | 13.3 | 76.15 |

In order to illustrate the rate of reaction, data are presented in Table IV and FIG. 2 in which the time is visible. Reaction is shown in Table IV and the time to a hard set.

TABLE IV

| Grams $(CH_2O)_x$ | Wt. percent | Time to visible reaction | | | Time to hard set | | |
|---|---|---|---|---|---|---|---|
| | | 1 | 2 | Ave. | 1 | 2 | Ave. |
| 0 | 0 | :46 | :43 | :44 | 1:27 | 1:27 | 1:27 |
| 0.05 | 1 | :42 | :39 | :40 | 1:10 | 1:07 | 1:08 |
| 0.1 | 2 | :40 | :37 | :38 | 1:16 | 1:15 | 1:15 |
| 0.2 | 4 | :35 | :38 | :36 | 1:13 | 1:18 | 1:16 |
| 0.3 | 6 | :34 | :35 | :34 | 1:10 | 1:11 | 1:10 |
| 0.4 | 8 | :34 | :34 | :34 | 1:09 | 1:09 | 1:09 |
| 0.5 | 10 | :35 | :35 | :35 | 1:07 | 1:11 | 1:09 |
| 0.75 | 15 | :33 | :33 | :33 | 1:09 | 1:10 | 1:09 |

These data are plotted in FIG. 2 which shows that up to about 4% by weight of the added formaldehyde results in rapid reaction and thereafter increased amounts have substantially little effect. FIG. 2 shows that the initial reaction levels off by the addition of 4 wt. percent and the time to hard set also levels off.

The present invention is therefore quite desirable and useful because it allows the rate and extent of curing of the adhesive such as aromatic-formaldehyde condensation products with phenol to be speeded up and a more efficient use of the adhesive made.

The present invention is effective and useful with aromatic formaldehyde condensation products with phenol having a wide range of oxygen contents. It is useful with high oxygen content adhesives. It is even more desirable for low oxygen content adhesives since these lower oxygen content adhesives may have the oxygen content increased by the practice of the present invention.

The nature and objects of the present invention having been completely described and illustrated and the best mode and embodiment contemplated set forth, what we wish to claim as new and useful and secure by Letters Patent is:

1. A method for increasing the rate and extent of curing of a xylene-formaldehyde condensation product with phenol employed as an adhesive for opposed porous surfaces which comprises:

adding to said condensation product an effective amount of formaldehyde up to about 4% by weight based on said condensation product, spreading said condensation product, added formaldehyde and an effective amount of an acid catalyst on at least one of said surfaces prior to reaction to join said surfaces, and joining said surfaces by reacting said condensation product and added formaldehyde by applying heat thereto at a temperature within the range from about 200° F. to about 400° F. in the presence of said effective amount of said acid catalyst to form a reaction product in no more than 3 minutes which has an oxygen content at least 13% by weight and over 95% by weight acetone insolubles, said condensation product having a viscosity at 80° F. within the range of 2,000 to 10,000, an average molecular weight within the range of 250 to 350, an oxygen content of 13.5 to 15, and a specific gravity of 1.08 to 1.10, said added formaldehyde being in the form of finely powdered paraformaldehyde, and said increase rate and extent of curing decreasing the time and temperature usually necessary for joining said surfaces and preventing unreacted adhesive from soaking into said surfaces.

2. A method in accordance with claim 1 in which said surfaces are wood.

3. A method in accordance with claim 1 in which the effective amount of the acid catalyst is within the range from about 0.5% to about 5% by weight based on the condensation product.

4. A method in accordance with claim 1 in which an amount of formaldehyde within the range from about 1% to about 2% by weight is added.

5. A method in accordance with claim 1 in which the reaction temperature is within the range from about 250° F. to about 300° F.

6. A method in accordance with claim 1 in which the catalyst is xylene sulfonic acid in an amount of about 3.5% by weight based on the condensation product.

7. A method in accordance with claim 1 in which said surfaces are joined and said reaction is conducted while pressing said surfaces together.

References Cited

UNITED STATES PATENTS

| | | |
|---|---|---|
| 2,395,739 | 2/1946 | Hersberger. |
| 2,954,360 | 9/1960 | Krzikalla et al. |
| 3,114,732 | 12/1963 | Von Brachel et al. |
| 3,178,393 | 4/1965 | Brandt et al. |
| 3,300,361 | 1/1967 | Brown _____ 156—335 |
| 3,345,249 | 10/1967 | Stephan _____ 161—262 |
| 3,347,952 | 10/1967 | Tanaka et al. _____ 260—67 XR |

WILLIAM H. SHORT, Primary Examiner

L. M. PHYNES, Assistant Examiner

U.S. Cl. X.R.

260—59

PO-1050
(5/69)

UNITED STATES PATENT OFFICE
CERTIFICATE OF CORRECTION

Patent No. 3,535,185          Dated October 20, 1970

Inventor(s) John L. Tveten and Rowland Pettit

It is certified that error appears in the above-identified patent and that said Letters Patent are hereby corrected as shown below:

In the drawing, the heading is to read

--J.L. Tveten et al--
in place of "J.L. Tveter et al".

SIGNED AND
SEALED

FEB 23 1971

(SEAL)
Attest:

Edward M. Fletcher, Jr.
Attesting Officer

WILLIAM E. SCHUYLER, JR
Commissioner of Patents